UNITED STATES PATENT OFFICE.

HENRY A. KOHMAN, CHARLES HOFFMAN, AND TRUMAN M. GODFREY, OF PITTSBURGH, PENNSYLVANIA, ASSIGNORS, BY MESNE ASSIGNMENTS, TO WARD BAKING COMPANY, OF NEW YORK, N. Y., A CORPORATION OF NEW YORK.

MANUFACTURE OF BREAD.

1,203,361.  Specification of Letters Patent.  Patented Oct. 31, 1916.

No Drawing. Application filed April 21, 1914, Serial No. 833,399. Renewed January 25, 1916. Serial No. 74,277.

*To all whom it may concern:*

Be it known that we, HENRY A. KOHMAN, CHARLES HOFFMAN, and TRUMAN M. GODFREY, citizens of the United States, all residing in the city of Pittsburgh, Allegheny county, State of Pennsylvania, have invented certain new and useful Improvements in the Manufacture of Bread; and we do hereby declare the following to be a full, clear, and exact description of the invention, such as will enable others skilled in the art to which it appertains to make and use the same.

Our invention relates to certain new and useful improvements in the manufacture of bread made from wheat flour, and has for its object to whiten and improve the texture of the ultimate product.

The invention is based upon the discovery that when the dough batch from which the bread is made, either by the sponge process or by the straight dough process, is subjected to the action of compressed oxygen or compressed atmospheric air, a whitening effect is exercised upon the dough, and that the cellular structure of the bread baked therefrom is small and uniform, the cell walls being notably thinner than in the usual manufacture; so that the physical appearance of the loaf is improved, both with respect to its color and with respect to its cellular structure or texture, as compared with loaves made from the same dough batch not treated in accordance with the present invention.

In putting the invention into practice, a suitable receptacle, preferably of metal, is employed, adapted to withstand, with safety, appropriate internal pressures. In the straight dough process, the ingredients of the dough batch are inserted in said receptacle; and, in the sponge process, the dough is inserted at the dough stage of the process. In either case, the dough batch occupies,—say one-third of the space within the receptacle, and is adapted to be mixed or kneaded by the customary pair of kneading arms, or the like. These arms may conveniently be mounted upon a vertical, an inclined, or a horizontal shaft, as preferred, and are operated from without by a suitable source of power, the shaft passing through an appropriate stuffing box, so as to guard against leakage of the oxygen and air during the stirring or kneading operation contemplated.

The compressed oxygen, or compressed air, as the case may be, is admitted to the receptacle, after the cover thereof has been carefully and tightly secured in place. The compressed oxygen or air may be supplied from a suitable container, or may be pumped into the receptacle itself. We find it suitable and desirable to admit the compressed oxygen or compressed air until the pressure thereof in the receptacle rises to say 80 lbs. to the square inch. Lower pressures (even down to 20 lbs. to the square inch) will give good results, but, in general, there is no advantage in pressures exceeding 80 lbs. to the square inch. It may be said, however, that where the lower pressures are employed, it is desirable to increase the time during which the dough is subjected to the action of the compressed oxygen or air. Thus, at a pressure of 20 lbs. to the square inch, and operating with compressed air, a decided bleach is obtained when the mixing or kneading operation is carried on for say 20 minutes. At 80 lbs. pressure, and operating with compressed air, a treatment of say 10 minutes suffices for the whitening effect desired, and, at the same 80 lbs. pressure, but operating with compressed oxygen, the time of treatment may be lowered to say 3 minutes with practically the same effect. It will be recognized, therefore, that the controlling factors of the operation, whether using compressed oxygen or compressed air, are the time factor and the pressure factor, and that, as noted, the time factor is considerably diminished when compressed oxygen is used, instead of compressed air.

The function of the stirring or kneading operation is to obtain a more intimate and constantly changing contact between the atmosphere of compressed air and the material of the dough batch, so as to obtain a more complete and homogeneous mixture and a speedier action than would be the case if the stirring or kneading were omitted. The mixing or kneading to be used in the practice of the present invention will correspond in kind to the usual mixing or kneading operation practised in the bread-making industry.

Another characteristic and radical advantage of our invention consists in the fact that it permits a saving of about 50% of the usual amount of yeast required for fermentation in the manufacture of bread either by the straight dough process or the sponge process. Furthemore, this saving in yeast is likewise accompanied by a corresponding saving in the sugar consumed during the fermentation process. This saving in sugar amounts to about 1% of the total weight of the flour employed in the making up of the dough batch.

Having thus described our invention, what we claim is:

1. In the manufacture of bread, the method of improving the quality of the loaf, which comprises subjecting the dough batch to a kneading operation in an atmosphere of an oxygenating aeroform fluid under pressure for a period of time sufficient to produce a whitening and maturing effect thereon; substantially as described.

2. In the manufacture of bread, the method of improving the quality of the loaf, which comprises subjecting the dough batch to a kneading operation in an atmosphere of oxygen under pressure for a period of time sufficient to produce a whitening and maturing effect thereon; substantially as described.

3. In the manufacture of bread, the method of improving the quality of the loaf, which comprises subjecting the dough batch to a kneading operation in an atmosphere of oxygen (associated with nitrogen, as atmospheric air) under pressure for a period of time sufficient to produce a whitening and maturing effect thereon; substantially as described.

4. In the manufacture of bread, the method of improving the quality of the loaf, which comprises subjecting the dough batch to a kneading operation in an atmosphere of an oxygenating aeroform fluid under a pressure of about 20 to 80 pounds per square inch for a period of time sufficient to produce a whitening and maturing effect thereon; substantially as described.

In testimony whereof we affix our signatures, in presence of two witnesses.

HENRY A. KOHMAN.
CHARLES HOFFMAN.
TRUMAN M. GODFREY.

Witnesses:
   E. C. Chance,
   E. Stevinson.